Feb. 8, 1927.   J. J. KRAKORA   1,617,058
BREAD SLICING MACHINE
Filed June 14, 1926   2 Sheets-Sheet 1
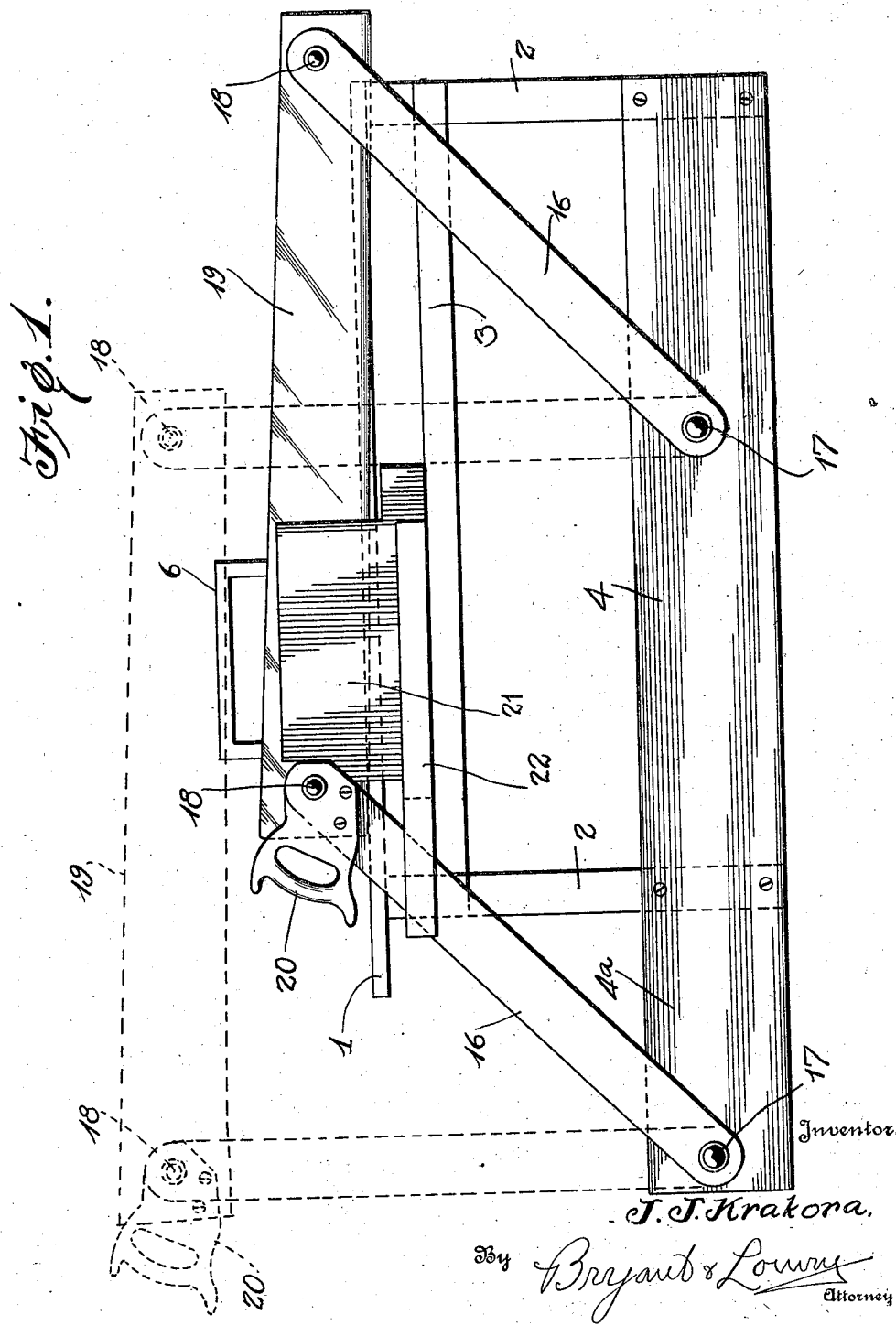

Feb. 8, 1927.
J. J. KRAKORA
1,617,058
BREAD SLICING MACHINE
Filed June 14, 1926    2 Sheets-Sheet 2
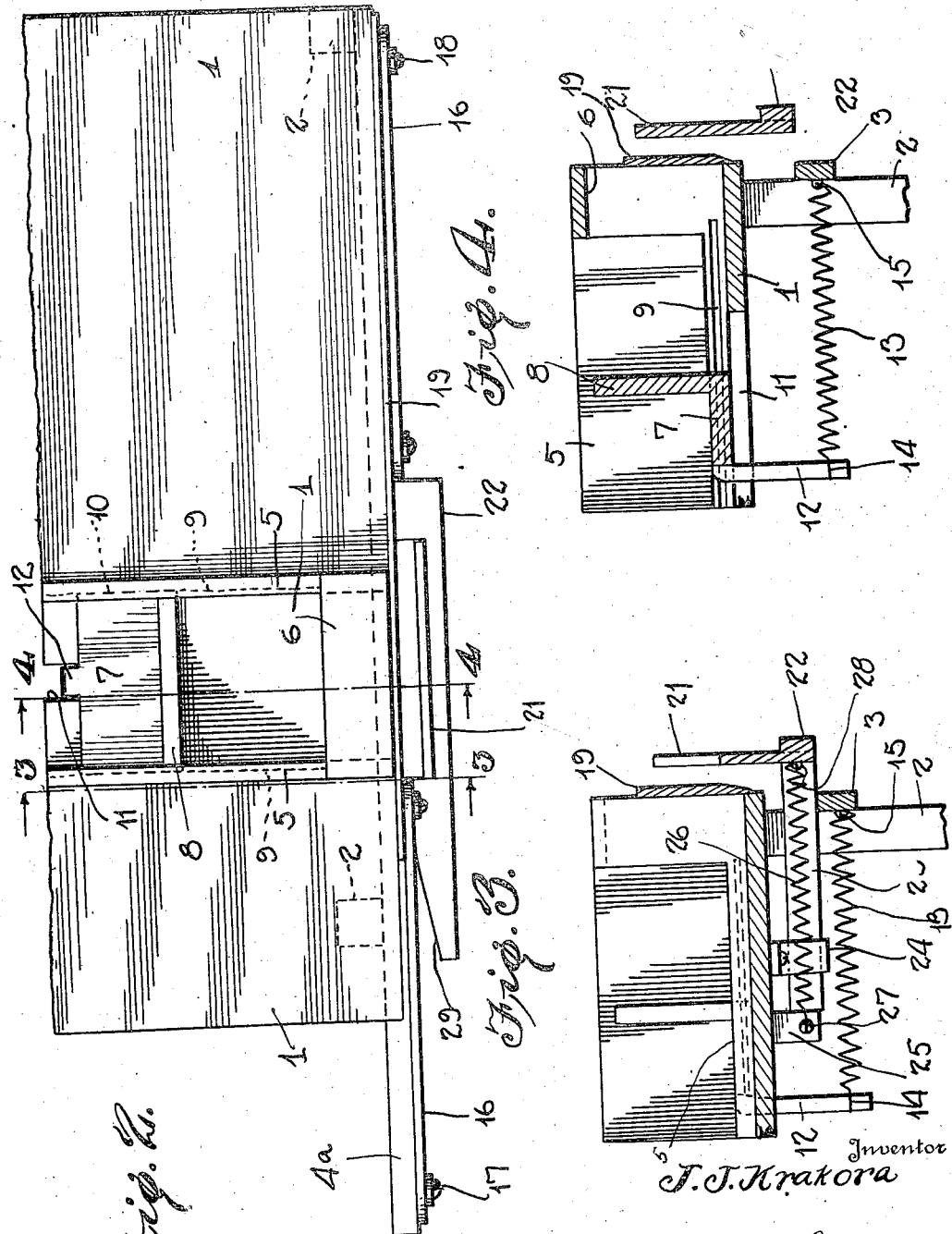
Inventor
J. J. Krakora
By Bryant & Lowry
Attorneys Patented Feb. 8, 1927.

1,617,058

UNITED STATES PATENT OFFICE.

JOHN J. KRAKORA, OF CROMWELL, MINNESOTA.

BREAD-SLICING MACHINE.

Application filed June 14, 1926. Serial No. 115,918.

This invention relates to certain new and useful improvements in bread slicing attachments for tables and has for its primary object to provide a bread slicing device associated with one end of a table top and comprising a slicing blade having link connections at each of its ends with a lower horizontal bar whereby the bread slicing blade during translation constantly assumes a horizontal position while moving transversely and downwardly at an angle through a loaf of bread.

A further object of the invention is to provide a bread slicing device of the type above set forth with a spring device for automatically feeding the bread under the slicing blade and with a tensioned stop for the bread to regulate the thickness of the slice and to be automatically moved outwardly to permit the slice of bread to fall into a tray or the like.

With the above and other objects in view that will become apparent as the nature of the invention is better understood, that same consists of the novel form, combination and arrangement of parts hereinafter more fully described, shown in the accompanying drawings and claimed.

In the drawings, wherein like reference characters designate corresponding parts throughout the several views, Figure 1 is an end elevational view of a table with the bread slicing device shown in side elevation, the bread slicing knife being shown by dotted lines in its elevated position, Figure 2 is a fragmentary top plan view, Figure 3 is a vertical cross-sectional view taken on line 3—3 of Fig. 2 showing the tensioned device for feeding the loaf of bread into the path of the slicing blade, and Figure 4 is a vertical cross-section view taken on line 4—4 of Fig. 2.

The bread slicing device is associated with a table comprising a top 1 supported upon corner legs 2, one end of the table being fragmentarily illustrated in Fig. 2, the corner legs at the end of the table herein illustrated being braced by the end bar 3 adjacent the table top 1 while a board 4 extends between the lower ends of the legs with an end extension 4ª as clearly illustrated in Fig. 1.

The guide for the loaf of bread includes a pair of perpendicular side walls 5 extending to one end of the table top 1 with a bridge piece 6 extending across the upper ends thereof at the table edge as clearly shown in Fig. 2. As shown more clearly in Figs. 2 and 4, there is provided a device for feeding the loaf of bread toward the slicing blade that is located at the end of the table and said feeding device comprises a base plate 7 having a vertical end wall 8 extending transversely of the guide between the side walls 5, the lower ends of the side walls being slotted as at 9 to receive tongues 10 at opposite ends of the base plate 7 to constitute a guiding means for the feeding device. The table top 1 beneath the guide is slotted as at 11 to provide a clearance for the depending arm 12 carried by the rear edge of the base plate 7, a coil spring 13 being attached at one end as at 14 to the lower end of the arm 12 while the forward end of the coil spring is attached as at 15 to the end brace bar 3 as shown in Fig. 4. It will therefore be seen that the coil spring 13 tends to move the base plate 7 and vertical wall 8 that engages the adjacent end of a loaf of bread toward the cutting blade at the end of the table.

The cutting blade and support therefor includes a pair of links 16 pivoted as at 17 to the board 4 and board extension 4ª as shown in Fig. 1 while the upper ends of said links are pivotally connected at 18 to the opposite ends of the slicing blade 19 that has a handle 20 upon one end thereof to facilitate operation. The link connections 16 together with the bottom board 4 and blade 19 form a parallelogram so that the lower cutting edge of the blade 19 constantly assumes a horizontal position while moving over the forward end of the bread loaf guide as illustrated.

To limit the forward movement of the loaf of bread under the influence of the spring pressed feeding device, there is provided a resiliently mounted stop in the form of a perpendicular wall 21 extending across the forward open end of the loaf guide as shown in Figs. 3 and 4, the board 21 being supported at its lower end upon the longitudinally extending bar 22 that carries laterally directed arms 23 supported adjacent their outer ends of the brace bar 3 with the inner ends thereof sliding through guide brackets 24 and with the terminal inner ends abutting the stops 25. A coil spring 26 is anchored at one end at 27 to the stop 25 while the other end thereof is anchored as at 28 to the bar 22. It will therefore be seen that the coil spring 26 moves the bar 22 and board 21 in a direction toward the delivery end of the loaf guide. The board 21 is spaced from the end of the guide to provide a clearance for the slicing blade 19 and for the thickness of a slice of bread to occupy the space between the cutting blade and the board 21. After the bread has been sliced by the blade 19, continued downward movement of the blade will position the link 16 at the handle end of the blade for engagement with the beveled end 29 of the bar 22 to laterally shift the bar outwardly of the table end against the tension of the spring 26 to free the cut slice of bread and permit the same to fall into a tray or other receptacle.

From the above detailed description of the device, it is believed that the construction and operation thereof will at once be apparent, it being noted that the follower for feeding the bread is operated by the spring 13 while the board 21 providing a stop for the forward projection of a loaf of bread is automatically shifted outwardly of the table end to permit the cut slice of bread to drop therefrom.

While there is herein shown and described the preferred embodiment of the present invention, it is nevertheless to be understood that minor changes may be made therein without departing from the spirit and scope of the invention as claimed.

What is claimed as new is:—

1. In a device of the class described, the combination with a table top, of a bread loaf feeding guide at one end thereof, a tensioned feeding device for the bread loaf and a slicing blade movable across the outer end of the loaf guide, the support for the slicing blade including a horizontal base board and parallel link connections between the ends of the blade and base board, a tensioned stop for the projected end of the bread loaf and means carried by the stop to be engaged by the adjacent blade supporting link for moving the stop outwardly of the table end to free the cut slice of bread.

2. In a device of the class described, the combination with a table top, of a bread loaf feeding guide at one end thereof, a tensioned feeding device for the bread loaf and a slicing blade movable across the outer end of the loaf guide, the support for the slicing blade including a horizontal base board and parallel link connections between the ends of the blade and base board, a tensioned stop for the projected end of the bread loaf and means carried by the stop to be engaged by the adjacent blade supporting link for moving the stop outwardly of the table end to free the cut slice of bread and means carried by the board and table top to limit movement of the board toward the table top to provide a clearance for the slicing blade and cut slice of bread.

In testimony whereof I affix my signature.

JOHN J. KRAKORA.